Figure 1:
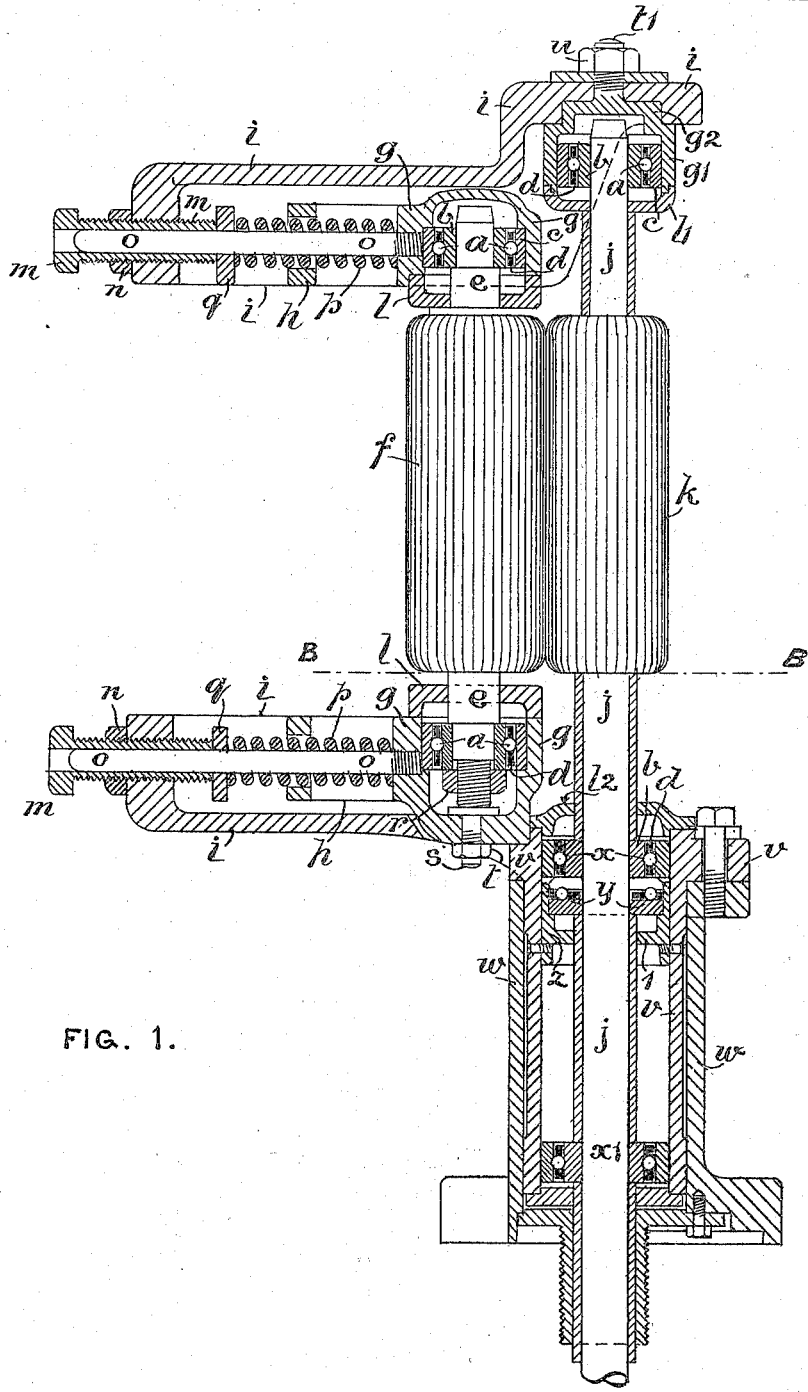

A. R. WHITEHEAD.
SPINDLE SUPPORT FOR ROLLERS FOR COMBING MACHINES.
APPLICATION FILED JUNE 24, 1909.

957,921.

Patented May 17, 1910.

2 SHEETS—SHEET 1.

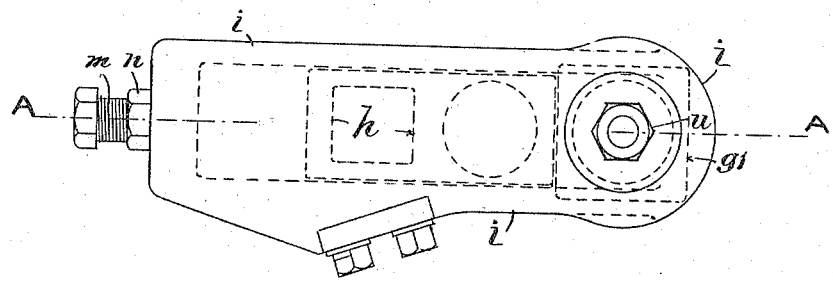
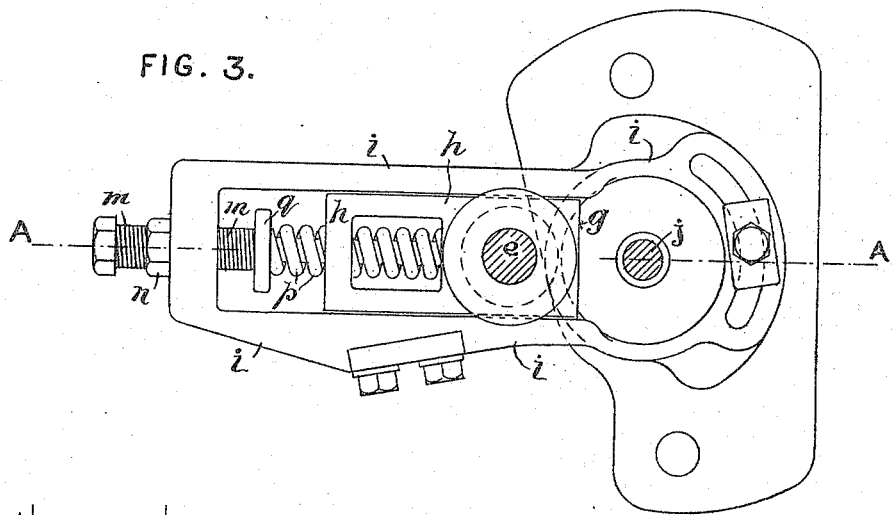
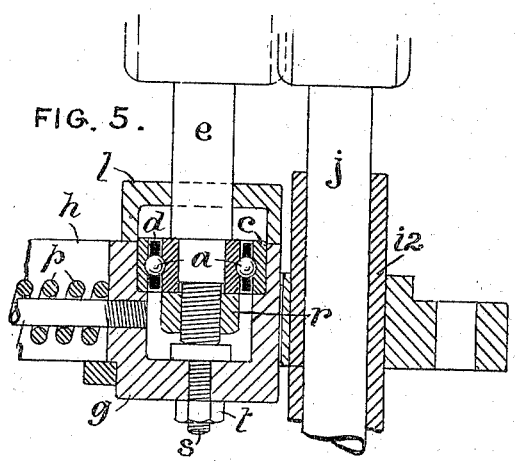
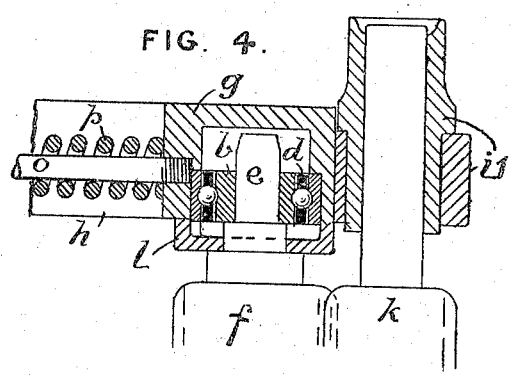

ns.

UNITED STATES PATENT OFFICE.

ALFRED ROBERT WHITEHEAD, OF HEADINGLEY, LEEDS, ENGLAND.

SPINDLE-SUPPORT FOR ROLLERS FOR COMBING-MACHINES.

957,921.             Specification of Letters Patent.    Patented May 17, 1910.

Application filed June 24, 1909. Serial No. 504,179.

*To all whom it may concern:*

Be it known that I, ALFRED ROBERT WHITEHEAD, a subject of the King of Great Britain and Ireland, and resident of Headingley, Leeds, in the county of York, England, have invented certain new and useful Spindle-Supports for Rollers for Combing-Machines, for which I have applied for a patent in Great Britain, No. 27,053, bearing date December 14, 1908, of which the following is a specification.

This invention relates to the application of ball bearings to the spindles of the pressing and drawing-off rollers of Noble's combing machines.

In order that the invention may be more readily and clearly understood, I have annexed hereto the accompanying sheets of drawings, in which—

Figure 1 is a vertical section on line A A of Figs. 2 and 3, and Fig. 2 is a plan and Fig. 3 a section on line B B of Fig. 1 of the pressing and drawing-off rollers of a Noble's combing machine to which this invention has been applied. Figs. 4 and 5 are vertical mid-sections of the brackets which carry the bearings for the upper and lower ends respectively of the pressing roller spindle, when the drawing-off roller spindle is carried in plain bearings. The ball bearings themselves are of the usual construction, consisting of balls $a$, an inner grooved ring $b$, an outer grooved ring $c$ and cage ring $d$ between the grooved rings.

The top and bottom bearings for the spindle $e$ of the fluted pressing roller $f$ are carried in circular recesses formed in square boxes $g$, hereinafter termed the "housings." These housings $g$ form one end portion of the sliding pieces $h$, which latter are fitted in the guide brackets $i$, carried from or about the long spindle $j$ of the drawing-off roller $k$. The housing recess for the top bearing of the pressing roller $f$ is formed from the underside of the housing; and that for the bottom bearing from the top side of its housing. These recesses are purposely made considerably deeper than the grooved rings, for the two fold purpose of forming a chamber or reservoir for a semi-solid lubricant or grease, and to allow the outer grooved rings $c$ freedom to move endwise or to adjust themselves; the inner rings $b$ being made a tight push fit on the spindle $e$, so that binding of the balls $a$ is avoided.

$l$ are recessed cap pieces for closing the open ends of the housing recesses, having holes formed through their closed ends to enable them to be slipped over the spindle $e$.

The outer ends of the guide brackets $i$ have tapped holes formed in them, in which are fitted the hollow tightening screws or bolts $m$, the latter being fitted also with lock nuts $n$. The interiors of the hollow bolts $m$ receive the outer ends of the guide spindles $o$, the inner ends of the latter being secured, by screwing or otherwise to the housings respectively. The spindle $o$ serves as a guide, to, or to prevent buckling of the pressing spring $p$; one end of which bears against the side face of the housing $g$. The other end of the spring $p$ bears against the washer $q$, inserted between it and the end of the tightening screw or bolt $m$. By tightening up or slacking back the tightening screw $m$, the pressure of the pressing roller $f$ against the drawing off roller $k$, can be increased or diminished.

The extreme ends of the pressing roller spindle $e$ are slightly less in diameter than the part fitting the inner grooved rings $b$ to admit of the ball bearings being lifted away from the spindle. The extreme lower end of the spindle $e$ is screwed to receive a nut $r$, to hold up the inner ring $b$ against the shoulder on the spindle $e$. A steel pin or stud $s$, with an enlarged head, is inserted through the bottom of the housing, and secured from rotation by means of a nut $t$ on its projecting end. The head of the pin or stud $s$ serves as a footstep bearing for the bottom end of the spindle $e$.

As it is chiefly in connection with the use of plain bearings for the spindle of the pressing roller, that certain disadvantages to be mentioned later, are met with, I do not always employ ball bearings for the drawing-off roller spindle. Where the latter are not used, I form the inner ends of the top and bottom brackets as plain bearings $i^1$ and $i^2$ see Figs. 3 and 4, surrounding the drawing-off roller spindle $j$.

Where this invention is applied to the drawing-off roller spindle $j$, I locate the top ball bearing in a housing $g^1$ Fig. 1, the top closed side of which is formed as a short cylindrical projection, $g^2$, fitting a circular recess in the underside of the boss portion of the bracket $i$. A screw stud $t^1$ projects from the center of the projection $g^2$, and passes through a central hole in the boss portion of the bracket $i$, and by means of a nut $u$ on the end of the stud $t^1$ serves to secure the housing $g^1$ to the bracket $i$. It will be evident, that if the nut $u$ is unscrewed, that the bracket $i$ and the bearing for the upper end of the pressing roller spindle can be removed without removing the top bearing of the drawing-off roller spindle.

$l^1$ is a dust cap closing the lower end of the housing. The portion $v$ of the bottom bracket surrounding the drawing-off roller spindle is formed as a cylinder $v$, fitted in a carrying cylinder $w$, which latter is bolted to the motion plate of the machine. The bracket cylinder $v$ is of sufficiently large diameter as shown in Fig. 1 to admit of a side ball bearing $x$ and a thrust ball bearing $y$ at its upper end. A sleeve $i^2$ (Fig. 5) fits the spindle $j$, which turns therein. A short cylinder $z$ with a closed bottom or diaphragm $l$ forms the housing for the thrust bearing $y$; while the space above the latter and below the dust cap $l^2$ receives the side ball bearing $x$. The spaces above and below these bearings form a reservoir for the grease or other lubricant.

The advantages to be obtained with ball bearings fitted to the vertical spindles of Noble's combing machine and constructed according to this invention are:—The balls of the bearings are running immersed in the lubricant; and the latter, especially if semi-solid, forms a dust proof covering for the bearing. By merely unscrewing the nut $u$, the top bracket $i$ and with it the bearing for the upper end of the pressing roller spindle can be removed, so that little time or trouble is required for changing the leather bands, which are drawn forward between the two rollers $f$ and $k$. The greatest advantage however I have found to arise from the decreased friction of the bearings and diminished tension in the leather bands or drawing-off leathers, which consequently last very much longer, besides working more efficiently.

Having now described my invention, what I claim and desire to secure by Letters Patent is:—

1. In combination with the pressing roller and the drawing off roller of a combing machine and their spindles, a pair of bearings for the ends of the pressing roller spindle, housings inclosing said bearings and adapted to exclude dust therefrom and means for pressing said housings and the parts moving therewith and inclosed thereby toward the drawing off roller.

2. In combination with the pressing roller and the drawing off roller of a combing machine and their spindles, bearings for the ends of the pressing roller spindle, housings inclosing said bearings, springs for pressing said housings toward the drawing off roller and means for adjusting the pressure of said springs.

3. In combination with the pressing roller and the drawing off roller of a combing machine and their spindles, bearings for the ends of the pressing roller spindles, housings containing said bearings, slides carrying said housings, springs acting on said slides, brackets guiding said slides and screws for adjusting the pressure of said springs.

4. In combination with a pair of drawing rollers of a combing machine a ball bearing for the spindle of one of them, a sliding housing containing said ball bearing, means for supporting and guiding said housing and a spring, adjustable in tension, acting on said housing substantially as set forth.

5. In combination with the spindle of the pressing roller of a combing machine, a ball bearing, a sliding piece, a housing carried by said piece and inclosing said bearing recess or housing formed at its inner end a dust excluding cap a pressing spring and a guide bracket, having a boss portion hinged on or about the drawing-off roller spindle, substantially as set forth.

6. In combination with a pair of rollers for a combing machine and their spindles, a ball bearing for one end of the pressing roller spindle, a sliding piece carrying a housing for said bearing, a dust-excluding cap for said housing a pressing spring, a spring spindle, a hollow pressure adjusting screw and a bracket having a boss portion hinged on or about the drawing-off roller spindle, all substantially as set forth and illustrated by Figs. 1 and 2 of the accompanying drawings.

7. In combination with the drawing off roller of a combing machine and its spindle, a ball bearing for the upper end of the latter, a housing inclosing said bearing projecting from the top closed end of the housing, and a fixed bracket having a boss recessed to fit on said projection and perforated to let said stud pass up through it as set forth.

8. In combination with the drawing off roller and its spindle a supporting bracket having a cylindrical part surrounding the lower part of said spindle, ball bearings for said spindle within said cylinder respectively near the upper and lower ends of the latter, a thrust ball bearing fixed at one point within said cylinder and sleeves and a supplemental housing respectively connected to the said three bearings substantially as set forth.

9. In combination with one of the drawing rollers of a combing machine and its spindle, a pair of ball bearings arranged at an interval to lessen the friction of rotary motion, an intermediate thrust bearing and a fixed hollow cylindrical part inclosing these three bearings substantially as set forth.

10. In combination with the pressing roller and drawing off roller of a combing machine and their spindles, a supporting bracket having a fixed hollow cylindrical part surrounding the drawing off roller spindle, ball bearings around said spindle within said cylindrical part, a ball bearing for the pressing roller spindle a housing inclosing said bearing and means for moving said housing toward said drawing roller, the said bracket being adapted to guide said housing in such motion substantially as set forth.

In testimony whereof I have signed my name to this specification in the presence of two subscribing witnesses.

ALFRED ROBERT WHITEHEAD.

Witnesses:
J. CLARK JEFFERSON,
WILLIAM SESTON EDMONDSON.